(12) United States Patent
Adachi (10) Patent No.: US 11,857,904 B2
(45) Date of Patent: Jan. 2, 2024

(54) GAS FILTERING DEVICE (71) Applicant: SUBARU CORPORATION, Tokyo (JP)

(72) Inventor: Shinji Adachi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/858,465

(22) Filed: Jul. 6, 2022

(65) Prior Publication Data
US 2023/0019062 A1 Jan. 19, 2023

(30) Foreign Application Priority Data
Jul. 19, 2021 (JP) ................................ 2021-119189

(51) Int. Cl.
*B01D 46/00* (2022.01)
*B01D 46/16* (2006.01)

(52) U.S. Cl.
CPC ......... *B01D 46/0005* (2013.01); *B01D 46/16* (2013.01); *B01D 2265/02* (2013.01); *B01D 2275/205* (2013.01); *B01D 2279/60* (2013.01)

(58) Field of Classification Search
CPC ............... B01D 46/0005; B01D 46/16; B01D 2265/02; B01D 2275/205; B01D 2279/60; B01D 46/10; F02M 35/00–0204; F02M 35/02491
See application file for complete search history.

(56) References Cited

U.S. PATENT DOCUMENTS

| | | | | |
|---|---|---|---|---|
| 5,472,379 A | * | 12/1995 | Andress | B60H 3/0658 55/502 |
| 2008/0110146 A1 | * | 5/2008 | Germain | F02M 35/0203 55/385.3 |
| 2009/0260996 A1 | | 10/2009 | Ikeda et al. | |
| 2011/0232983 A1 | * | 9/2011 | Abe | F02M 35/10039 55/385.3 |
| 2017/0335806 A1 | * | 11/2017 | Kuemmerling | B01D 46/0005 |

FOREIGN PATENT DOCUMENTS

| | | | | | |
|---|---|---|---|---|---|
| CN | 103038491 A | * | 4/2013 | ............ | B01D 46/10 |
| DE | 102011087526 A1 | * | 6/2013 | ............ | B01D 46/10 |
| DE | 102016005660 A1 | * | 11/2017 | | |
| EP | 3228376 A1 | * | 10/2017 | ......... | B01D 46/0004 |
| JP | H07-119568 A | | 5/1995 | | |
| JP | H11-82193 A | | 3/1999 | | |
| JP | 2009-257517 A | | 11/2009 | | |

* cited by examiner

*Primary Examiner* — Hung Q Nguyen
(74) *Attorney, Agent, or Firm* — McGinn I.P. Law Group, PLLC (57) ABSTRACT

A gas filtering device includes an element and a case. The element includes a filter that filters a gas and a frame that holds a periphery of the filter. The case accommodates the element. The case includes a first member and a second member that are coupled to each other with the element interposed therebetween. The first member includes a frame holder that holds a periphery of the frame when the first member is coupled to the second member, and a temporary holder that performs temporary holding of the frame so that a part of the frame is separated from the frame holder and the frame is curved when the first member is not coupled to the second member. The second member includes a temporary-holding canceller that cancels the temporary holding of the frame by the temporary holder when the second member is being coupled to the first member.

11 Claims, 9 Drawing Sheets

FIG. 9

GAS FILTERING DEVICE

CROSS-REFERENCE TO RELATED APPLICATIONS

The present application claims priority from Japanese Patent Application No. 2021-119189 filed on Jul. 19, 2021, the entire contents of which are hereby incorporated by reference.

BACKGROUND

The disclosure gas relates to a gas filtering device that filters a gas and separates foreign substances.

For example, in an automobile engine, an air cleaner, which is a gas filtering device that separates foreign substances such as dust in air and purifies fresh air (combustion air) is provided in an air intake device that supplies the fresh air to the engine.

The air cleaner includes, for example, an element and a case that accommodates the element. The element includes a frame and a filter that is provided inside of the frame. The filter is made from filtration paper, sponge, or the like.

In general, the case is divided into two members (half members), and the element is held so as to be interposed between junctions of the half members of the case.

As a technology related to such an air cleaner, for example, Japanese Unexamined Patent Application Publication No. H7-119568 describes the following. An air cleaner element includes, inside thereof, a rectangular frame that holds a filter. The frame has a pair of protrusions, which protrude toward first-case half members, at central portions of an upper side and a lower side of the frame. A slit-shaped engagement hole is formed in a central portion of each of the protrusions. The first-case half member has an engagement projection that is engageable with the engagement hole.

Japanese Unexamined Patent Application Publication No. H11-82193 describes an air cleaner including a hinge structure and a fixing unit. The hinge structure is disposed at an end portion of a support frame that holds a filtering element at a seating position in an air cleaner case. The hinge structure has a configuration attachable and detachable between the end portion and a wall portion of the air cleaner case, and allows swing of the support frame in a direction such that the filtering element becomes closer to/separated from the seating position. The fixing unit can be locked at a swing position of the support frame when the filtering element reaches the seating position.

Japanese Unexamined Patent Application Publication No. 2009-257517 describes the following. A closing-holding mechanism is provided between two case members that are openable and closable and that are made of a synthetic resin. One of the case members has a protrusion an outer surface thereof. A stop hole that extends along the outer surface of the case member is formed in the protrusion. An engagement portion is formed so as to be integrated with an outer surface of the other case member via a generally U-shaped elastically deformable piece that can elastically deform in a direction perpendicular to the outer surface of the case member. Moreover, it is described that a guide surface for guiding the engagement portion toward the inside of the stop hole is formed on the entrance side of the stop hole, and a holding portion for holding a craw of the engagement portion is formed on the exit side of the stop hole.

SUMMARY

An aspect of the disclosure provides a gas filtering device including an element and a case. The element includes a filter and a frame. The filter is configured to filter a gas. The frame holds a periphery of the filter and has flexibility. The case accommodates the element. The case includes a first member and a second member that are configured to be coupled to each other with the element interposed between the first member and the second member. The first member includes a frame holder and a temporary holder. The frame holder is configured to hold a periphery of the frame of the element in a case where the first member is coupled to the second member. The temporary holder is configured to perform temporary holding of the frame so that a part of the frame of the element is separated from the frame holder and the frame is curved in a case where the first member is not coupled to the second member. The second member includes a temporary-holding canceller configured cancel the temporary holding of the frame by the temporary holder in a case where the second member is being coupled to the first member.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

In general, a frame of an element used in an air cleaner of an engine is made of a flexible material, such a rubber-based material, having a sealing function as a packing. The frame itself does not have a sufficient rigidity that allows the frame to maintain its shape.

When installing such an element into a case during an operation of attaching the element, replacing the element, or the like, it is necessary for an operator to attach one half member of the case to the other half member of the case while pressing the element toward the other half member with his/her hand so that four corners of the frame can be located at regular positions.

Such an operation is cumbersome and very difficult, and, for example, it is necessary for the operator to perform the operation without looking at the element because it is difficult to perform the operation while looking at the element, depending on the layout in an engine room.

In consideration of the above problem, it is desirable to provide a gas filtering device that facilitates an operation of attaching an element.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

An air cleaner that is an air filtering device according to a first embodiment of the disclosure will be described.

The air cleaner according to the first embodiment is, for example, a device that filters combustion air (fresh air) for an engine, which is mounted in an automobile such as a car, and reduces foreign substances such as dust in the combustion air.

Figure 1:
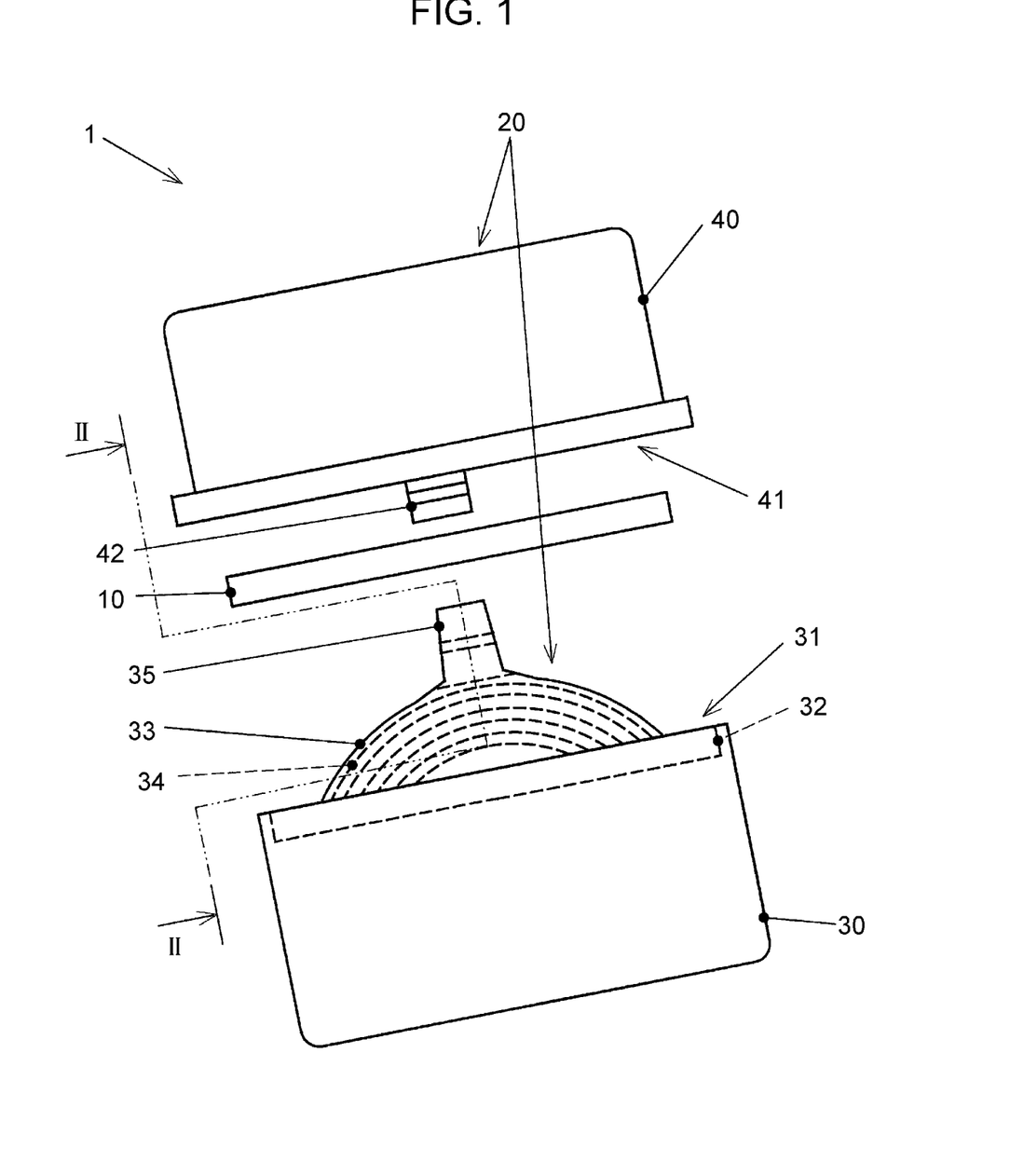
FIG. 1 is an exploded side view of an air cleaner that is a gas filtering device according to a first embodiment of the disclosure.

FIG. 1 is an exploded side view of an air cleaner 1 that is a gas filtering device according to the first embodiment.

Figure 2:
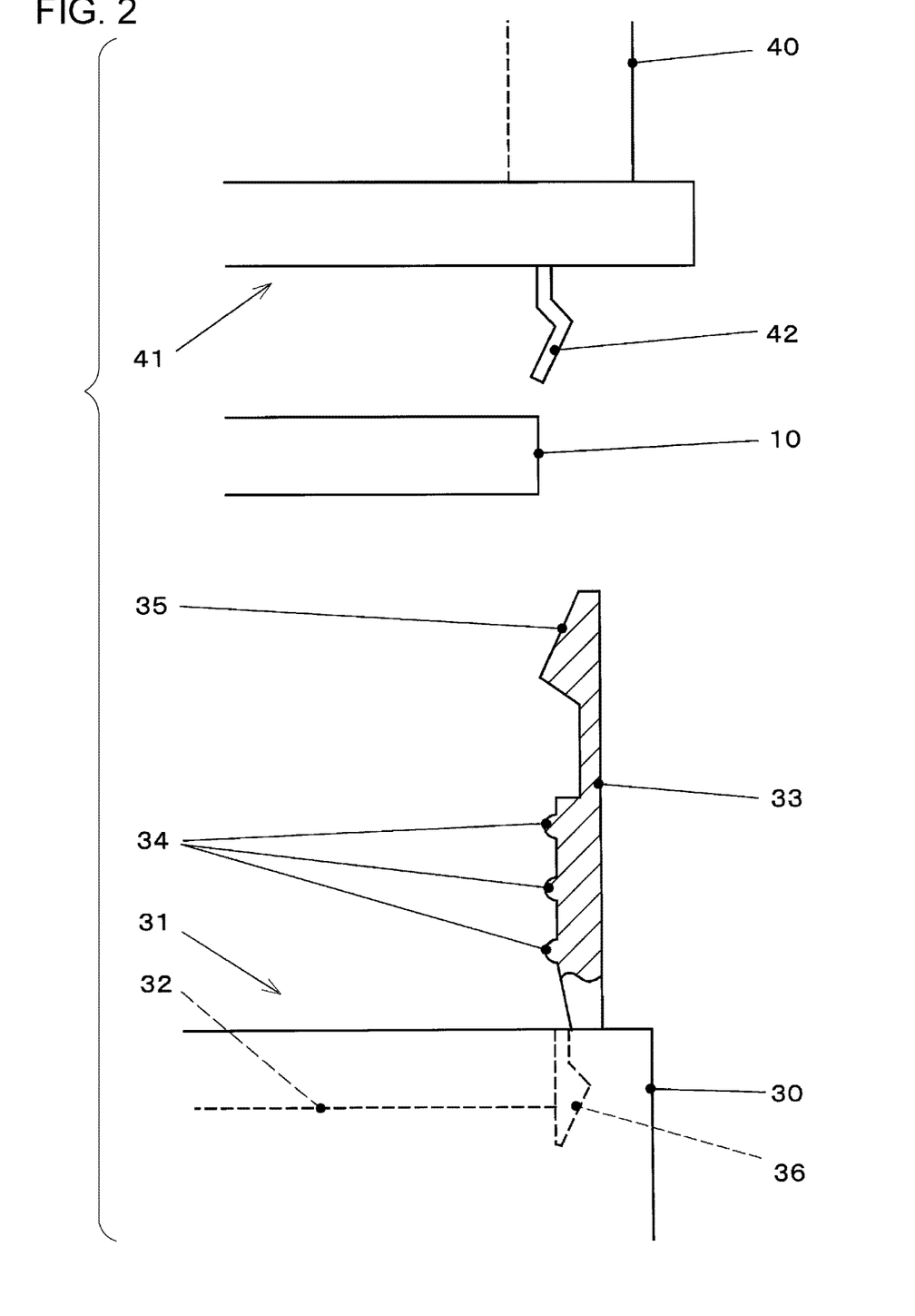
FIG. 2 is an enlarged view taken along line II-II of FIG. 1.

FIG. 2 is an enlarged view taken along line II-II of FIG. 1.

The air cleaner 1 includes an element 10 and an air cleaner case 20.

The element 10 includes a frame and a filter that is held inside of the frame. The frame is made of a flexible sealing material such as a rubber-based material. The filter is made from filtering paper, sponge, or the like. The filter filters air passing therethrough, and reduces foreign substances and the like.

The element 10 itself does not have a sufficient rigidity that allows the element 10 to maintain its shape. The element 10 has a sufficient flexibility that allows both end portions thereof to hang down due to their own weight in a case where, for example, a side edge of the frame is supported at a middle portion thereof.

The element 10 has a rectangular shape as seen in a direction in which air flows therethrough (the up-down direction in FIG. 1 and FIG. 2).

The air cleaner case 20 is shaped like a box that accommodates the element 10, and air to be filtered (combustion air for an engine (not illustrated)) flows through the air cleaner case 20.

The air cleaner case 20 is divided into a first member 30 and a second member 40, in order from the engine side (downstream side).

The first member 30 and the second member 40 are made from, for example, an elastic resin material such as polypropylene (PP) by, for example, injection molding or the like.

The first member 30 is a box-shaped member into which air that has passed through the element 10 is introduced. The first member 30 has an opening 31 that opens toward the second member 40.

The first member 30 has a frame holder 32, which holds the frame of the element 10, on an inner peripheral edge of the opening 31.

When the air cleaner 1 is being used, the surface of the frame holder 32 is in close contact with an outer peripheral edge of the frame of the element 10 over the entire periphery, and is sealed by the rubber-based material of the frame.

The frame holder 32 is disposed so that a surface of the attached element 10 on the second member 40 side (typically, a surface on a side from which air flows into the element 10) faces upward or diagonally upward.

The first member 30 is fixed to, for example, a vehicle body (not illustrated). The second member 40 is removable from the first member 30 when, for example, replacing the element 10.

The second member 40 (not illustrated) is a box-shaped member into which air introduced from an air intake port (typically, atmospheric air that flows into the engine room from the vehicle front side) is introduced, and has an opening 41 that opens toward the first member 30.

The element 10 is installed so as to be interposed between the first member 30 and the second member 40 in a state in which the frame is fitted into the frame holder 32.

Filtered air that has passed through the element 10 and flowed into the first member 30 is supplied to the engine via an intake duct (not illustrated).

The first member 30 includes a sticking-out surface portion 33 that is integrated with a body portion, a ridge 34, a claw 35, and the like.

The sticking-out surface portion 33 is a flat-plate-shaped portion that is provided in a region adjacent to a middle portion of each of a pair of opposing sides of the frame of the element 10 and that protrudes from an outer edge of the frame holder 32 of the first member 30 toward the second member 40.

A pair of the sticking-out surface portions 33 are disposed so as to face each other with the element 10 interposed therebetween.

The ridge 34 protrudes from a surface of the sticking-out surface portion 33 on the inside of the air cleaner case 20 (a side facing the other sticking-out surface portion 33).

As illustrated in FIG. 1, the ridge 34 extends along a circular arc that is convex toward the second member 40.

A plurality of the ridges 34 (for example, three ridges 34) are concentrically arranged.

As illustrated in FIG. 2, in the cross-sectional shape of the ridge 34 taken along a plane that intersects the longitudinal direction thereof, a surface of the ridge 34 has a curved-surface shape along a circular arc that is convex toward the inside of the air cleaner case 20.

When the element 10 is being attached to the first member 30, the ridge 34 interferes with the frame, and functions as a temporary holder that temporarily holds a part of the frame in a state (protruding state) in which the part is separated toward the second member 40 with respect to the frame holder 32.

The claw 35 protrudes further toward the second member 40 from the tip of the sticking-out surface portion 33 on the second member 40 side.

As illustrated in FIG. 2, the claw 35 has an inclined surface that comes into contact with a claw 42 of the second member 40 and that causes the sticking-out surface portion 33 to incline in a direction such that the sticking-out surface portion 33 falls toward the outside of the first member 30.

The claw 42 is provided on a region, which is adjacent to the sticking-out surface portion 33, of the edge of the opening 41 of the second member 40.

The claw 42 protrudes from the edge of the opening 41 toward the first member 30.

When the second member 40 is being attached to the first member 30, the claw 42 comes into contact with the claw 35 of the first member 30 and performs a function of pressing the claw 35 in a direction such that the claw 35 is opened toward the outside of the air cleaner case 20 in accordance with a relative displacement of the second member 40 toward the first member 30.

The claw 42 is a temporary-holding canceller that cancels temporary holding of the frame of the element 10 by the temporary holder 34 when the second member 40 is being coupled to the first member 30.

A recess 36, which accommodates the claw 42 after the first member 30 and the second member 40 have been coupled to each other, is formed in an inner surface of the first member 30.

Next, a process of installing the element 10 in the air cleaner 1 according to the first embodiment will be described.

Figure 3:
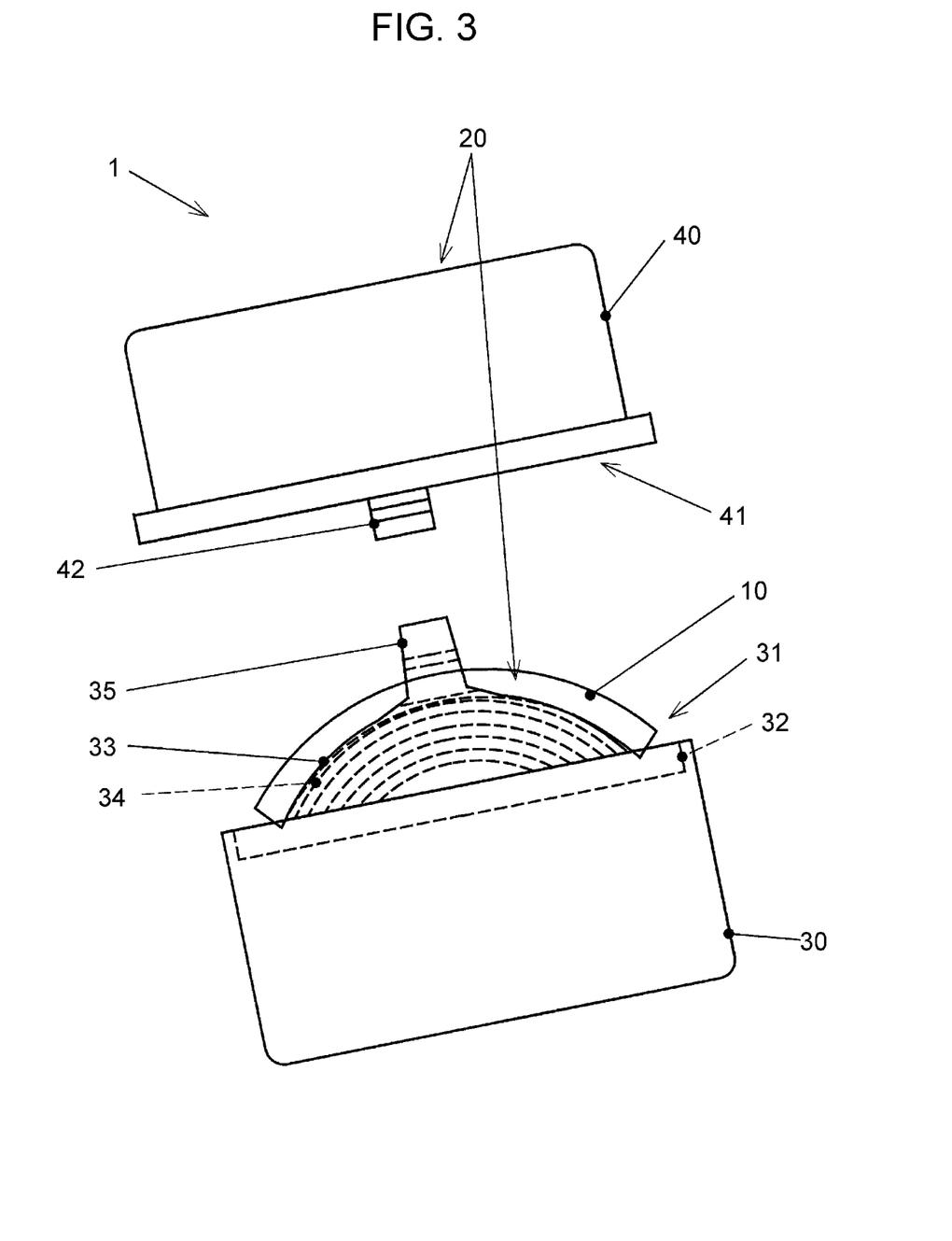
FIG. 3 illustrates a state in which an element is placed on a first member in the air cleaner according to the first embodiment.

FIG. 3 illustrates a state in which the element 10 is placed on the first member 30 of the air cleaner 1 according to the first embodiment.

When an operator holds the element 10 at the opening 31 of the first member 30 of the air cleaner case 20 and presses the element 10 toward the frame holder 32, a middle portion of each of the pair of opposing sides of the frame of the element 10 is temporarily held in a state of protruding from the frame holder 32 toward the second member in a state of being caught on the ridge 34.

At this time, the frame of the element 10 is curved along the curve of the ridge 34 in a direction such that the frame is convex toward the second member 40.

Thus, a part of an end portion of the frame of the element 10 (an upper end portion and a lower end portion in FIG. 3) is inserted to the inside of the frame holder 32 in a state in which the part has a gap with respect to a corner portion of the frame holder 32.

Subsequently, the operator attaches the second member to the first member 30.

Figure 4:
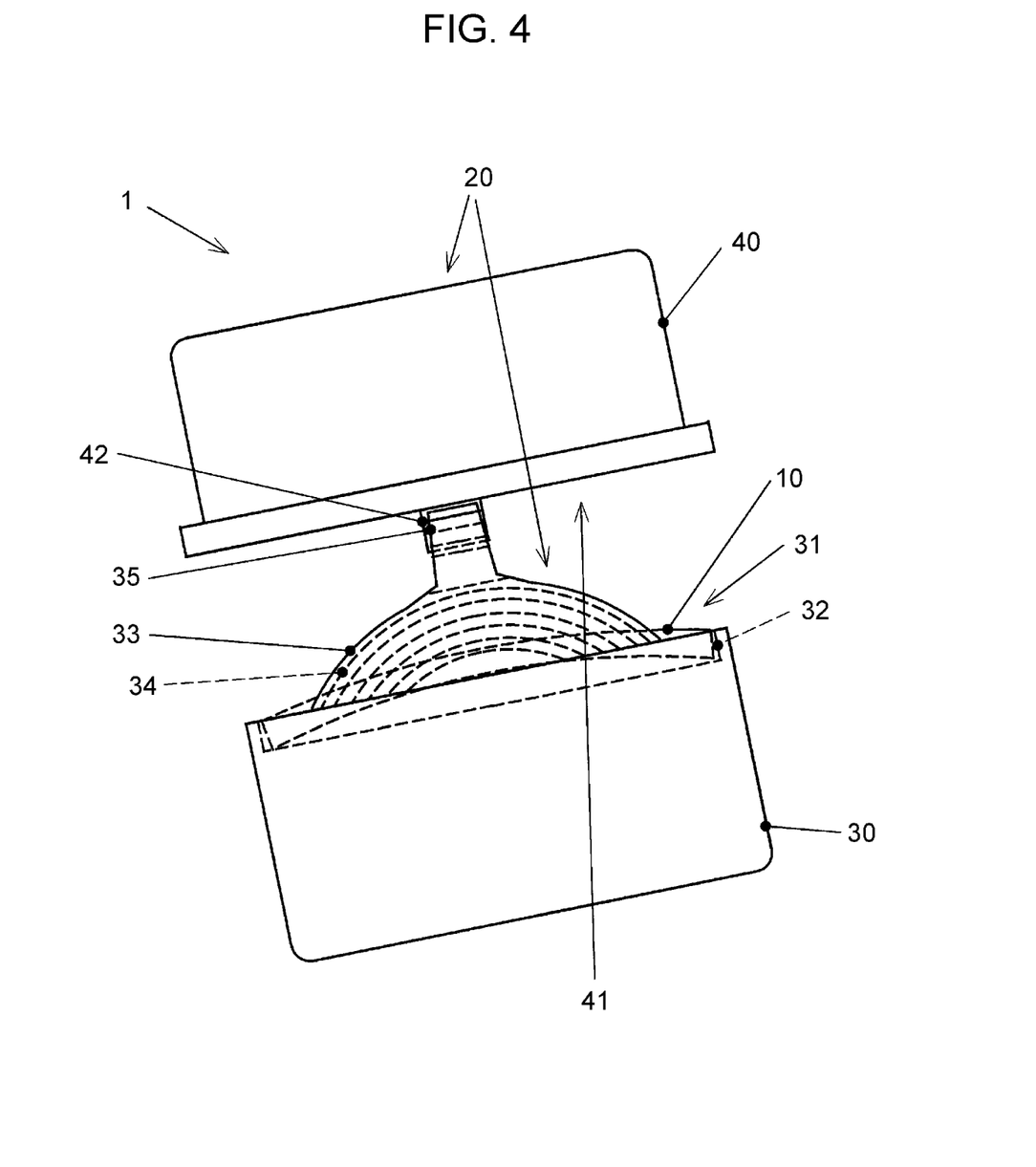
FIG. 4 illustrates a state in which a second member is being attached to the first member in the air cleaner according to the first embodiment.

FIG. 4 illustrates a state in which the second member is being attached to the first member 30 in the air cleaner 1 according to the first embodiment.

When the second member 40 is moved closer to the first member 30 and the claw 35 of the first member 30 and the claw 42 of the second member come into contact with each other, a force acting between the inclined surfaces of the claws 35 and 42 causes the sticking-out surface portion 33 of the first member 30 to deform so as to fall in a direction such that the sticking-out surface portion 33 opens toward the outside of the air cleaner case 20 (the right side in FIG. 2).

Thus, the ridge 34 displaces in a direction away from the frame of the element 10, temporary holding of the frame of the element 10 by the ridge 34 is cancelled (released), and the element 10 enters the frame holder 32 while reducing the curvature thereof (while relaxing the curvature).

Figure 5:
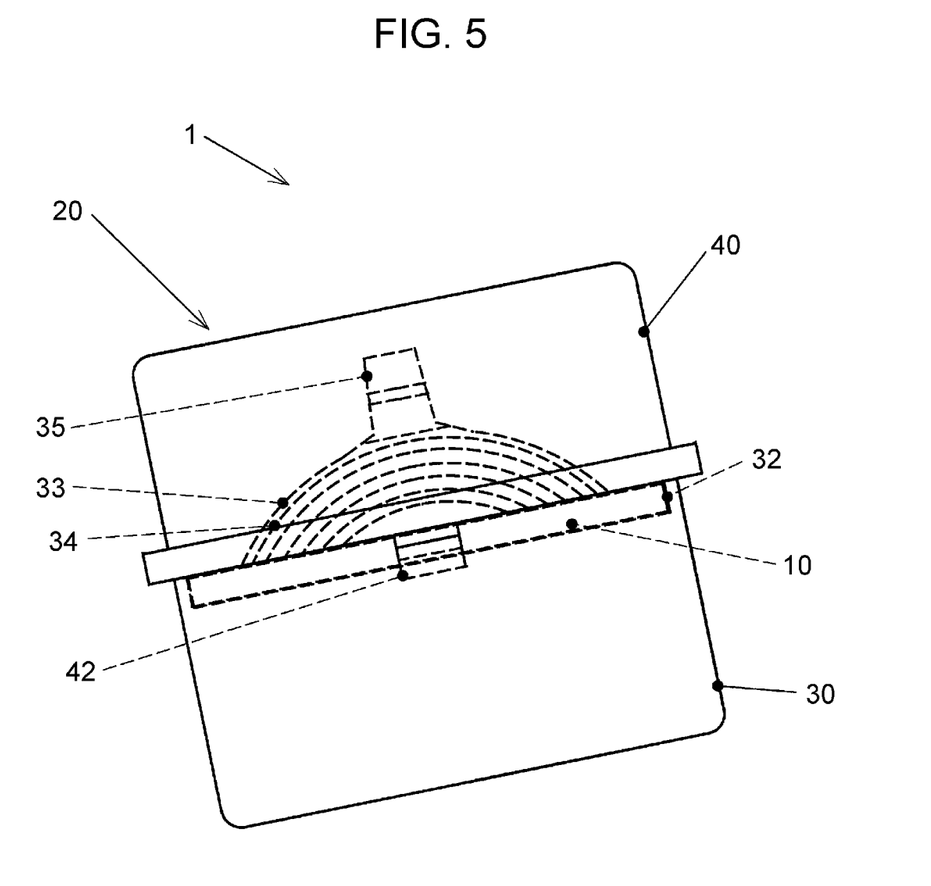
FIG. 5 illustrates a state in which the first member and the second member have been coupled to each other in the air cleaner according to the first embodiment.

FIG. 5 illustrates a state in which the first member 30 and the second member 40 have been coupled to each other in the air cleaner 1 according to the first embodiment.

When the second member 40 is moved further closer to the first member 30 and finally the peripheral edge of the opening 41 of the second member 40 is in contact with the peripheral edge of the opening 31 of the first member 30, the element 10 is held by the frame holder 32 in a state in which the element 10 is interposed between the first member 30 and the second member 40 and the element 10 is substantially flat.

In this state, the first member 30 and the second member 40 are fixed to each other, by using, for example, a mechanical fastener (not illustrated) such as a metal clip.

At this time, the claw 42 of the second member 40 is accommodated in the recess 36 (see FIG. 2), which is formed in the inner surface of the first member 30.

With the first embodiment heretofore described, it is possible to obtain the following advantageous effects.

(1) Because the ridge 34 of the first member 30 holds the frame of the element 10 in a curved state before the second member 40 is attached, it is not necessary for an operator to press the element 10 with his/her hand, and, further, the end portions of the element 10 (the four corners of a rectangular shape) can easily enter the frame holder 32.

By attaching the second member 40 to the first member 30 in this state, temporary holding of the element 10 by the ridge 34 is cancelled and the frame of the element 10 becomes accommodated in the frame holder (the element 10 falls into the frame holder due to its own weight in a case where the opening 31 is facing upward or diagonally upward), and it is easy to perform the operation of attaching the element 10.

(2) Because the sticking-out surface portion 33 having the ridge 34 is provided at a position sticking out toward the second member 40 with respect to the frame holder 32 and the claw 42 of the second member 40 displaces the ridge 34 in a direction away from the frame when the second member 40 is moved closer to the first member 30, it is possible to obtain the aforementioned advantageous effects with a simple configuration that uses elastic deformation of each member.

(3) Because the frame of the element 10 has a rectangular shape and the ridge 34 temporarily holds a middle portion of each of a pair of opposing sides of the frame, it is possible to bend the element 10 so that both end portions thereof become closer toward the first member 30 with the portion where the frame is temporarily held by the ridge 34 as the apex, and it is possible to reliably obtain the aforementioned advantageous effects.

(4) Because the ridge 34, which temporarily holds the frame of the element 10, has a circular arc shape that is convex toward the second member 40, it is possible to appropriately control the shape of the element 10 so that the element 10 becomes curved to be convex toward the second member 40, and it is possible to reliably obtain the aforementioned advantageous effects.

Second Embodiment

Next, an air cleaner that is an air filtering device according to a second embodiment of the disclosure will be described.

In each embodiment described below, portions that are common to those of an embodiment already described will be denoted by the same numerals and descriptions of such portions will be omitted, and mainly the differences will be described.

Figure 6:
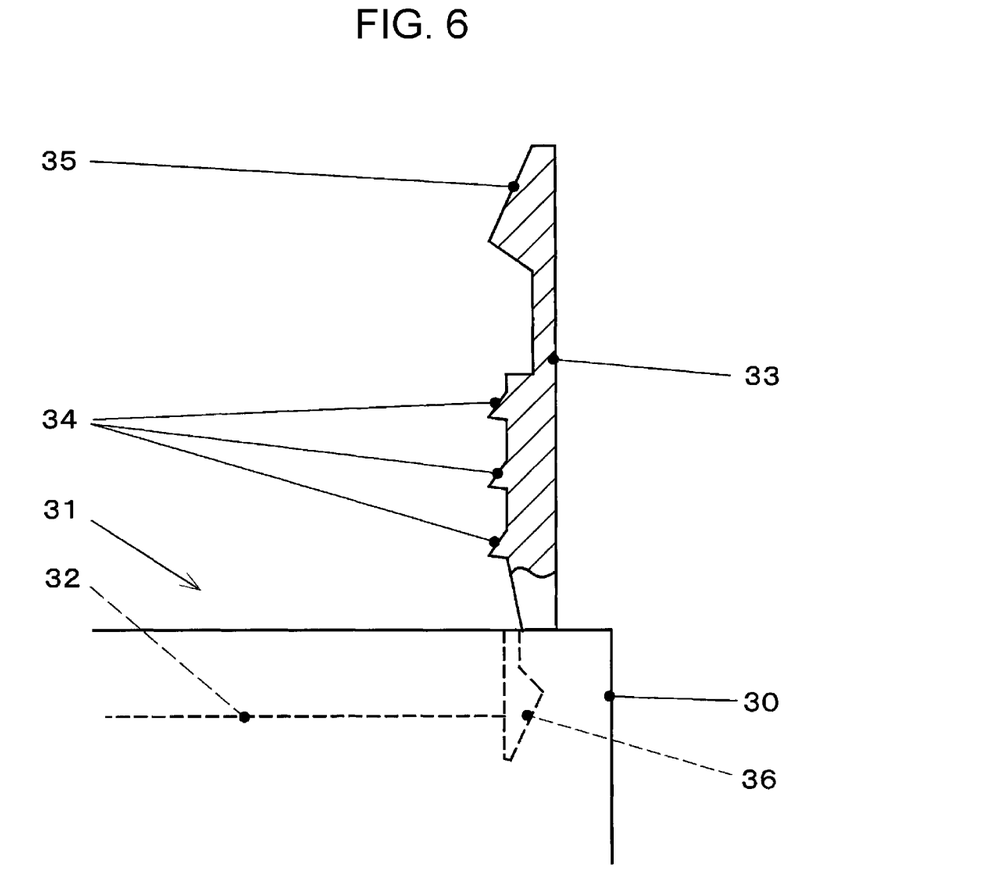
FIG. 6 illustrates a region around a sticking-out surface portion of a first member of an air cleaner that is a gas filtering device according to a second embodiment of the disclosure.

FIG. 6 illustrates a region around a sticking-out surface portion 33 of a first member 30 of an air cleaner according to the second embodiment (corresponding to FIG. 2 of the first embodiment (the element 10 and the second member 40 are not illustrated)).

In the second embodiment, the cross-sectional shape of a ridge 34 taken along a plane perpendicular to the longitudinal direction thereof is a triangular shape (a saw-tooth shape).

With the second embodiment heretofore described, in addition to the advantageous effects of the first embodiment described above, by changing the angle of the inclined surface of the ridge 34 in the cross-sectional shape, it is possible to appropriately adjust the resistance force when the frame of the element 10 is temporarily held and to appropriately adjust the easiness of cancelling temporary holding.

Third Embodiment

Next, an air cleaner that is an air filtering device according to a third embodiment of the disclosure will be described.

Figure 7:
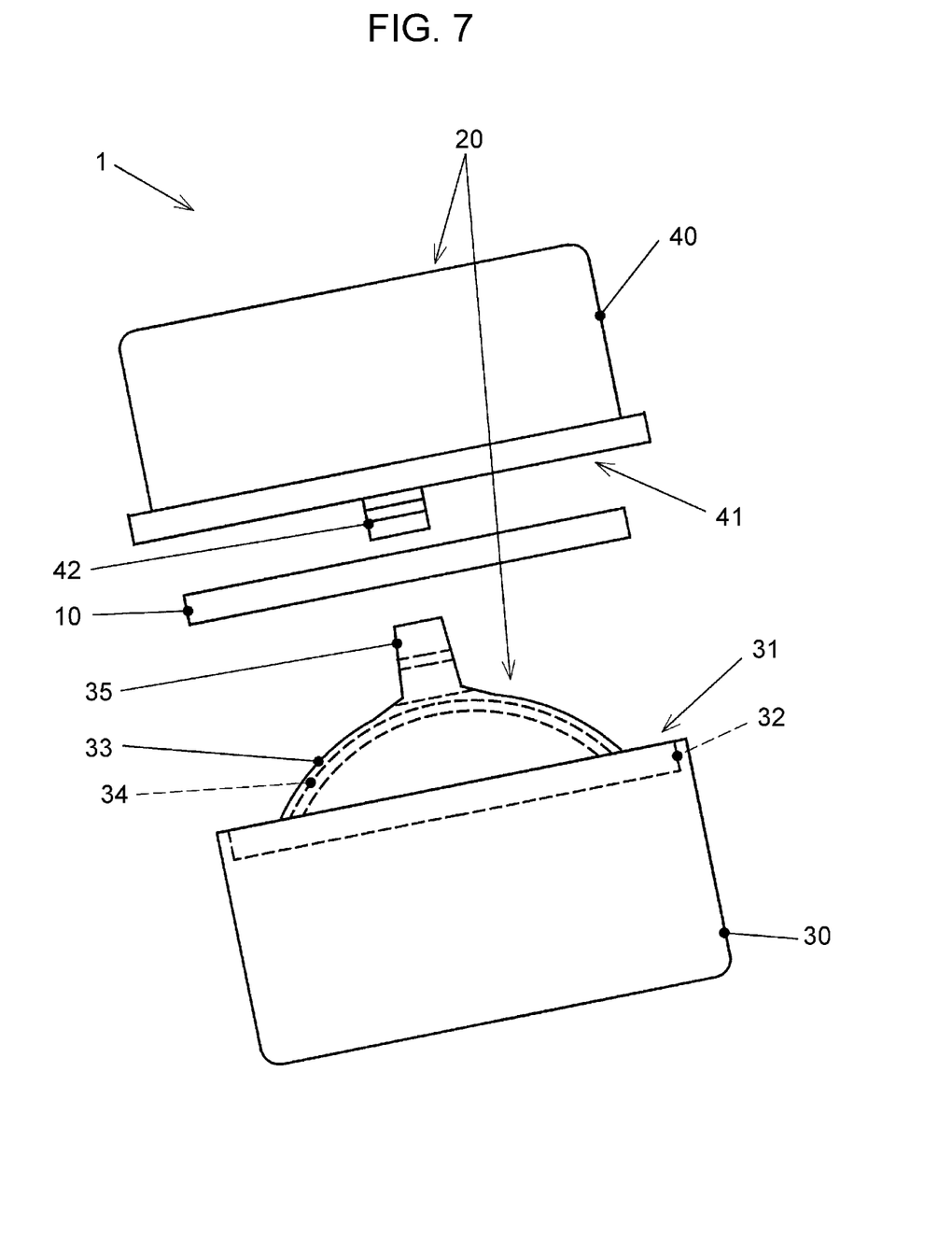
FIG. 7 is an exploded side view of an air cleaner that is a gas filtering device according to a third embodiment of the disclosure.

FIG. 7 is an exploded side view of an air cleaner 1 that is a gas filtering device according to the third embodiment.

The third embodiment has one ridge 34 that extends along a circular arc that is convex toward the second member as in the first embodiment and that corresponds to a radially-outermost ridge 34 in the first embodiment.

With the third embodiment heretofore described, in addition to the advantageous effects of the first embodiment described above, by changing the number of the ridges 34, it is possible to appropriately adjust the resistance force when the frame of the element 10 is temporarily held and to appropriately adjust the easiness of cancelling temporary holding.

Fourth Embodiment

Next, an air cleaner that is an air filtering device according to a fourth embodiment of the disclosure will be described.

Figure 8:
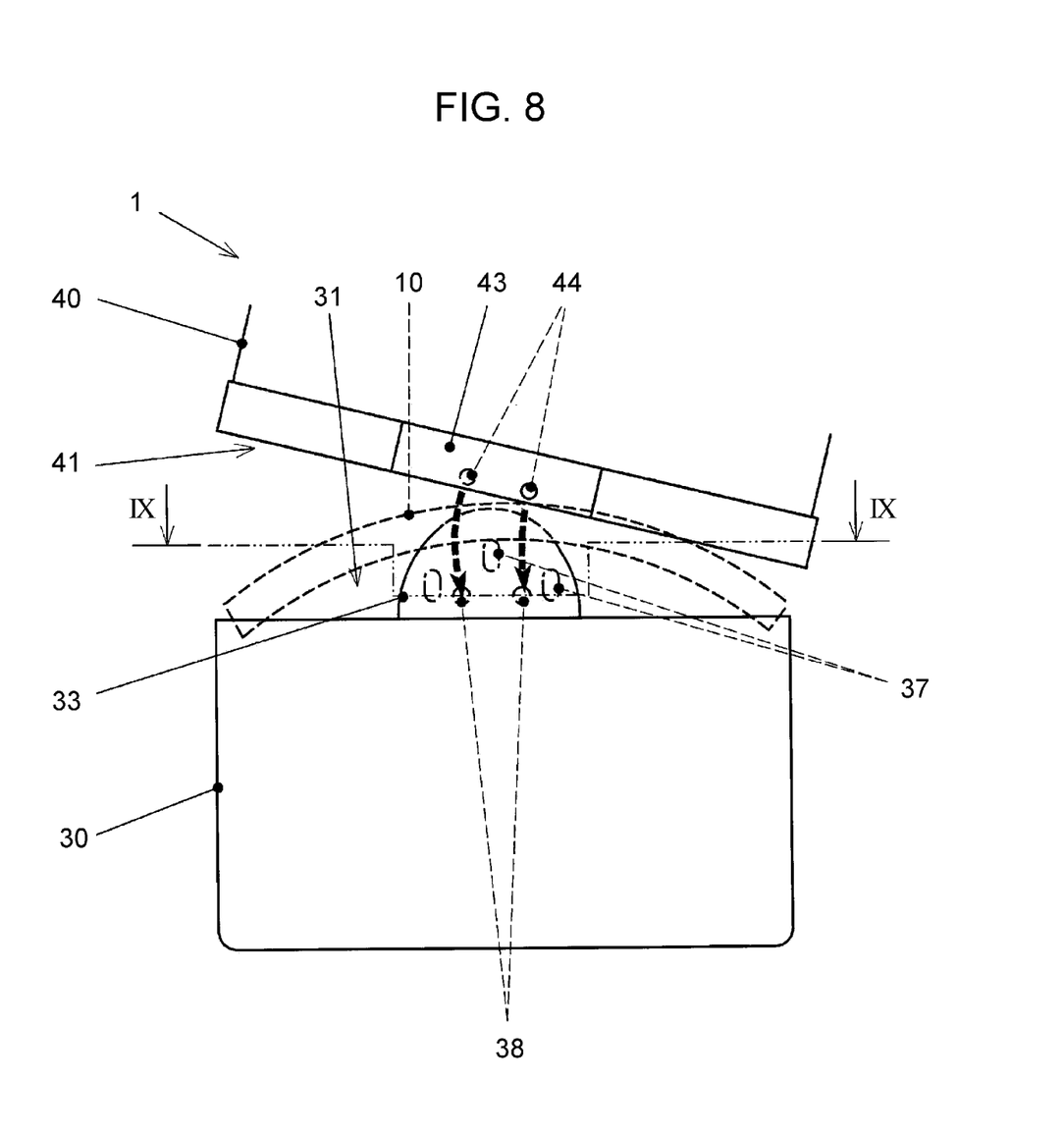
FIG. 8 is an exploded side view of an air cleaner that is a gas filtering device according to a fourth embodiment of the disclosure.

FIG. 8 is an exploded side view of an air cleaner 1 according to the fourth embodiment.

Figure 9:
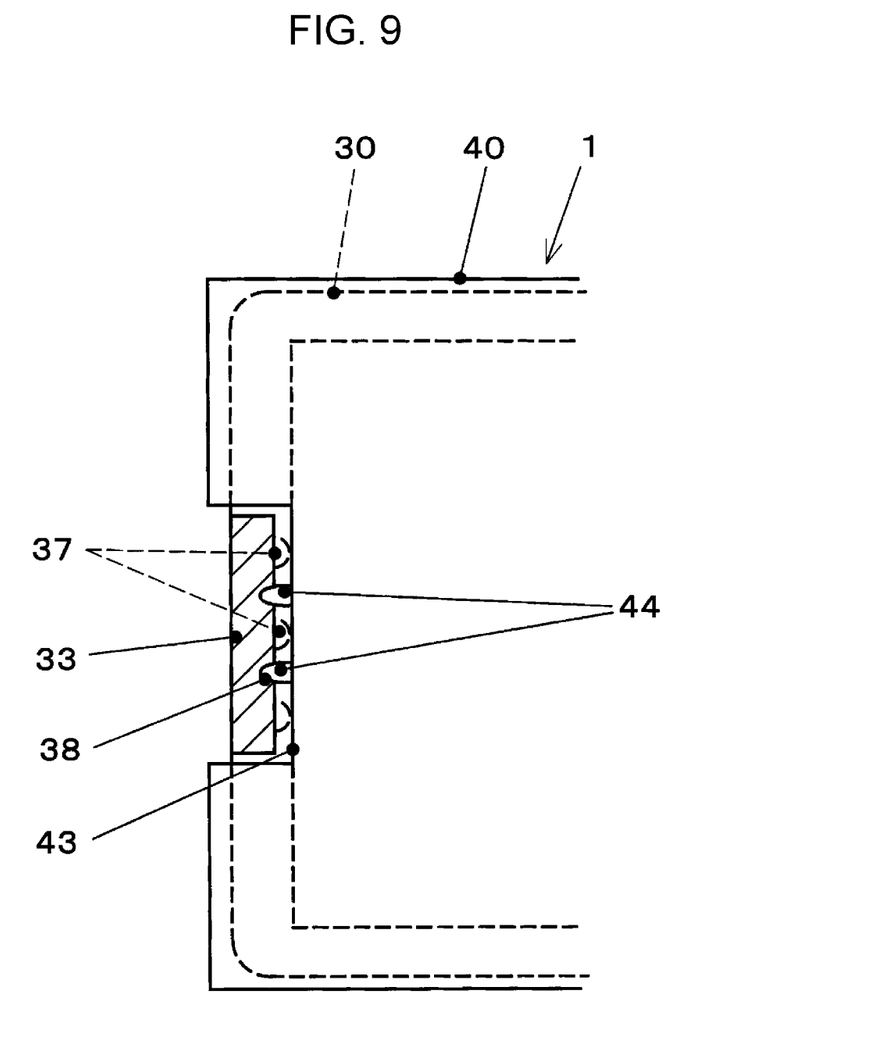
FIG. 9 is a sectional view of a coupled portion between a first member and a second member in the air cleaner according to the fourth embodiment.

FIG. 9 is a sectional view of a coupled portion between a first member 30 and a second member 40 in the air cleaner 1 according to the fourth embodiment (taken along line IX-IX in FIG. 8 (after the second member 40 has been coupled)).

The fourth embodiment has a projection 37 and a recess 38 on a sticking-out surface portion 33 of the first member instead of the ridge 34 and the claw 35 of the first embodiment.

The projection 37 is a temporary holder that holds the frame of the element 10 in a state in which the frame is curved in an arc shape that is convex toward the second member 40.

The projection 37 protrudes from a surface of the sticking-out surface portion 33 on the inside in the air cleaner case 20.

The projection 37 has, for example, an oval shape having a longitudinal direction that is the protruding direction in which the sticking-out surface portion 33 protrudes from the frame holder 32.

For example, three projections 37 are arranged along a circular arc that is convex toward the second member 40.

The recess 38 is a portion in which a projection 44 of the second member 40 is accommodated in a state in which the first member 30 and the second member 40 are coupled to each other.

The recess 38 is formed in a surface of the sticking-out surface portion 33 on the inside in the air cleaner case 20.

The second member 40 has a step 43 and the projection 44, instead of the claw 42 of the first embodiment.

The step 43 is recessed, toward the inside of the air cleaner case 20, in a stepped manner in a region of a peripheral edge of the opening 41 where the sticking-out surface portion 33 is formed in the first member 30.

The sticking-out surface portion 33 is disposed so as to be positioned outside of the step 43 in a state in which the first member 30 and the second member 40 are coupled to each other.

The projection 44 projects from the step 43 toward the outside of the air cleaner case 20.

For example, two projections 44 are arranged along an edge of the opening 41.

The projection 44 is a temporary-holding canceller in the fourth embodiment.

In the fourth embodiment, when the element 10 is placed at the opening 31 of the first member 30, the frame of the element 10 is temporarily held by the projection 37 in a state in which the frame is curved in an arc shape that is convex toward the second member 40 as illustrated in FIG. 8.

Subsequently, when the second member 40 is attached to the first member 30, first, the projection 44 presses the sticking-out surface portion 33 so that the sticking-out surface portion 33 falls toward the outside of the air cleaner case 20.

When the sticking-out surface portion 33 is pressed by the projection 44 and deforms so as to warp toward the outside the air cleaner case 20, temporary holding of the frame of the element 10 by the projection 37 is cancelled, and the element 10 enters a frame holder (not illustrated) provided inside of the opening 31.

When the second member 40 is moved further toward the first member 30, the projection 44 passes through the gap between the projections 37, and, finally becomes accommodated in the recess 38 in a state of being fitted into the recess 38.

With the fourth embodiment heretofore described, in addition to the advantageous effects of the first embodiment described above, a claw or the like does not protrude from the second member 40 that is removed and attached when, for example, replacing the element 10, and it is possible to prevent trouble such as breakage of the claw.

(Modifications)

The disclosure is not limited to the embodiments heretofore described, it is possible to make various modifications and changes, and the modifications and changes are within the scope of the disclosure.

(1) The configuration of the gas filtering device is not limited to those of the embodiments described above, and may be changed as appropriate. For example, the shape, the structure, the material, the manufacturing method, the disposition, and the like of each member of the element and the case may be changed as appropriate.

The configurations of the temporary holder and the temporary-holding canceller are not limited.

(2) The gas filtering device in each embodiment is, for example, an air cleaner that filters air (fresh air) to be sucked by an engine. However, the disclosure is not limited to this, and is applicable to gas filtering devices having other uses. For example, the disclosure is applicable to purification of blow-out air in an air conditioner, a ventilator, a heater or the like, and to filtering of another gas.

As heretofore described, with the disclosure, it is possible to provide a gas filtering device that facilitates an operation of attaching an element.

The invention claimed is:

1. A gas filtering device comprising:
   an element that comprises a filter and a frame, the filter being configured to filter a gas, the frame holding a periphery of the filter and having flexibility; and
   a case that accommodates the element,
   wherein the case comprises a first member and a second member that are configured to be coupled to each other with the element interposed between the first member and the second member,
   wherein the first member comprises
      a frame holder configured to hold a periphery of the frame of the element in a case where the first member is coupled to the second member, and
      a temporary holder configured to perform temporary holding of the frame so that a part of the frame of the element is separated from the frame holder and the frame is curved in a case where the first member is not coupled to the second member, and
   wherein the second member comprises a temporary-holding canceller configured to cancel the temporary holding of the frame by the temporary holder in a case where the second member is being coupled to the first member.

2. The gas filtering device according to claim 1,
   wherein the temporary holder comprises a protrusion that is provided at a position sticking out toward the second member with respect to the frame holder of the first member and that protrudes so as to interfere with the frame of the element, and
   wherein the temporary-holding canceller displaces the protrusion in a direction away from the frame in a case where the first member is being attached to the second member.

3. The gas filtering device according to claim 1,
   wherein the frame of the element has a rectangular shape, and
   wherein the temporary holder temporarily holds a middle portion of each of a pair of opposing sides of the frame.

4. The gas filtering device according to claim 2,
   wherein the frame of the element has a rectangular shape, and
   wherein the temporary holder temporarily holds a middle portion of each of a pair of opposing sides of the frame.

5. The gas filtering device according to claim 1, wherein the temporary holder comprises a protrusion and the protrusion of the temporary holder comprises a ridge having an arc shape that is convex toward the second member.

6. The gas filtering device according to claim 2,
   wherein the protrusion of the temporary holder is a ridge having an arc shape that is convex toward the second member.

7. The gas filtering device according to claim 3,
   wherein the temporary holder comprises a protrusion and the protrusion of the temporary holder comprises a ridge having an arc shape that is convex toward the second member.

8. The gas filtering device according to claim 4,
   wherein the protrusion of the temporary holder is a ridge having an arc shape that is convex toward the second member.

9. The gas filtering device according to claim 2,
   wherein the protrusion of the temporary holder comprises projections that are disposed along an arc that is convex toward the second member.

10. The gas filtering device according to claim 3,
    wherein the temporary holder comprises a protrusion and the protrusion of the temporary holder comprises projections that are disposed along an arc that is convex toward the second member.

11. The gas filtering device according to claim 4,
    wherein the protrusion of the temporary holder comprises projections that are disposed along an arc that is convex toward the second member.

* * * * *